United States Patent

Schmidt et al.

[15] 3,702,010

[45] Oct. 31, 1972

[54] INFORMATION RETRIEVAL STRATEGY

[72] Inventors: Robert Benjamin Schmidt, Arlington Heights; George Wallace Smith, Jr., Naperville; Robert Bernard Walford, Lombard, all of Ill.

[73] Assignee: Bell Telephone Laboratories, Incorporated, Murray Hill, N.J.

[22] Filed: Oct. 12, 1970

[21] Appl. No.: 80,036

[52] U.S. Cl. .......................................................444/1
[51] Int. Cl. ...................................................G06f 9/16
[58] Field of Search .........................340/172.5; 444/1

[56] References Cited

UNITED STATES PATENTS

| | | | |
|---|---|---|---|
| 3,307,153 | 2/1967 | Bauer | 340/172.5 |
| 3,568,156 | 3/1971 | Thompson | 340/172.5 |

*Primary Examiner*—Raulfe B. Zache
*Attorney*—R. J. Guenther and R. B. Ardis

[57] ABSTRACT

A method for retrieving variable length file listings from a file of listings is disclosed. Each listing in the file is identified as belonging to one of the plurality of classes of listings comprising the file by means of a fixed length class byte in the listing format. The length of each listing is recorded in a similar fashion in the listing format. A computer program containing a matching subroutine for each class of listing contained in the file controls a stored program computer during a search of the file. During such a search, the computer accesses the class byte in the current listing being processed and uses this byte to determine the address of the matching subroutine to be used in processing the listing. Similarly, the computer uses the length byte in the current listing to calculate the address of the listing to be processed after processing of the current listing is completed.

7 Claims, 7 Drawing Figures

INVENTORS R. B. SCHMIDT
G. W. SMITH
R. B. WALFORD
BY Norman D. McClaskey
ATTORNEY

FIG. 2

| $a_1$ ADDRESS | FILE LISTING |
|---|---|
| $MA_1$ | $a_1$ CL1 LL1 SMITH $a_2$ JOHN $a_3$ B $a_5$ WHEATON ··· $a_n$ TN ··· |
| $MA_2$ | $a_1$ CL2 LL2 SMITH $a_2$ JOHN $a_3$ D $a_4$ 220 WEST AVE. $a_5$ WHEATON ··· $a_n$ TN ··· |
| $MA_3$ | $a_1$ CL2 LL3 SMITH $a_2$ JOHN $a_3$ F $a_4$ 310 N. MAIN $a_5$ WHEATON ··· $a_n$ TN ··· |
| $MA_4$ | $a_1$ CL3 LL4 SMITH $a_2$ JOHN $a_3$ H $a_4$ 10 S. MAIN $a_4$ 501 N. ASH $a_5$ WHEATON ··· $a_n$ TN ··· |
| ⋮ | ⋮ |
| $MA_n$ | |

FIG. 3

| PMF | PROGRAM MAINFLOW |
|---|---|
| | ⋮ |
| MS1 | CLASS ONE MATCHING SUBROUTINE (SUB 1) |
| | ⋮ |
| MS2 | CLASS TWO MATCHING SUBROUTINE (SUB 2) |
| | ⋮ |
| MS3 | CLASS THREE MATCHING SUBROUTINE (SUB 3) |
| | ⋮ |
| AMS1 | MS1 |
| AMS2 | MS2 |
| AMS3 | MS3 |

SUB 3

INFORMATION RETRIEVAL STRATEGY

BACKGROUND OF THE INVENTION

1. Field of the Invention

This invention relates to automated information processing and more particularly to retrieving desired variable length information listings that possess selected characteristics from a file.

2. Description of the Prior Art

The prior art shows a method of retrieving variable length file listings in which the various entries in each listing are separated by delimiters. Each delimiter in a file listing identifies the nature of the listing entry with which it is associated. For instance, such a file listing might contain, among other things, a last name entry with its associated delimiter and a residential address entry with its associated delimiter. Associated delimiters and information entries appear in sequence in the listing format.

File listings, such as those described above, are accessed sequentially and each delimiter in each listing is processed sequentially by the prior art circuitry. A search of the variable format file may be performed using varying combinations of characteristics as the criteria for retrieving a listing. Consider, for example, the case where it is desirable to retrieve the listing containing a selected last name and residential address. These two characteristics and their associated delimiters are supplied, by a user, to the prior art circuitry which is designed to retrieve from the file. Initially, the supplied delimiter associated with the last name is compared with listing delimiters encountered during the sequential scanning of the entries in a file listing to locate the last name entry in the listing. Once this last name entry is located, it is compared with the last name supplied to the circuitry by the user. If the two names are identical, scanning of the listing continues, comparing delimiters encountered in the listing with the supplied residence delimiter.

When a delimiter is encountered in the listing that is identical to the supplied residence delimiter, the next data available from the file listing will be the residential entry for that listing. This residential entry is compared with the supplied residential data and if they are identical, a listing possessing the desired last name and residential characteristics has been located. This listing is then retrieved from the file by the circuitry.

If a mismatch of last names occurs during the processing of the listing discussed above, the circuit will not attempt to locate and compare the residence entry in the listing since the listing cannot possibly possess the desired characteristics. In other words, upon determining that the last name entry in the listing is different than the supplied last name, it is obvious that the listing does not contain the desired information. When this occurs, there is no need to locate the residence entry and compare it with the supplied residential address. In this situation, the circuit makes no use of the supplied address delimiter. Instead, the circuit immediately begins, again, comparing the supplied last name delimiter with the listing delimiters being encountered sequentially in the listing. None of the listing delimiters encountered will match the supplied address delimiter until the listing delimiter preceding the last name entry in the file listing following the listing in which the mismatch occurred is encountered. At this point the above operations are repeated.

In essence, the prior art shows circuitry for retrieving variable length listings comprised of variable length entries separated by delimiters. The circuitry allows the user to specify selected ones of the types of entries in the file listing as criteria for retrieving a listing. During the search of the file, the delimiters and entries comprising listings are processed sequentially and only those selected entries in the listing specified by the user are compared with the retrieval criteria supplied by the user in determining if the listing is to be retrieved. The other entries in the listing are ignored by the circuitry.

SUMMARY OF THE INVENTION

In applications where large files are frequently searched, the time required to search the file becomes a critical factor. Applicants' invention reduces the time required to search a file in the following manner. The listings in the file to be searched are each assigned to one of a plurality of classes of variable length listings, where all the listings assigned to a given class have certain characteristics in common. The format of each listing includes an entry identifying the class to which the listing belongs and an entry indicating the length of the listing, in addition to delimiters and information entries. A search of the file is initiated by a user keying retrieval criteria consisting of delimiters and descriptors into a computer. During the search, a portion of the file is stored in the memory of a computer programmed to operate in accordance with applicants' invention. The first listing in this portion of the file is located by the main flow of the program controlling the computer and the class and length entries in this listing are accessed. The accessed length entry is used to compute the beginning address of the second file list in memory and this address is stored. The class entry is used to determine the address of a matching subroutine designed to efficiently process the class of listings to which the first listing belongs. While under the control of the selected matching subroutine, the computer performs matching operations similar to those performed by the prior art circuit. When the execution of the matching subroutine is completed, either due to a mismatch in a listing entry with one of the descriptors comprising the specified retrieval criterion or due to the retrieval criteria being satisfied, control of the computer is transferred from the matching subroutine to the main flow of the program. At this point, the listing being searched has either been discarded due to a mismatch or has been retrieved for display as a result of a match and the processing of the next listing begins. The computer directly addresses the next listing using the computed address derived from the length entry contained in the first listing rather than using sequentially available listing delimiters to locate the next listing as is done in the prior art. This ability to address the next listing without having to wait for the serial accessing of the remaining entries in the listing being processed results in a substantial saving in time. Following the direct addressing of the next listing, the above operations are repeated for the second listing.

In essence, the invention includes program control information in the format of each file listing that is used by the computer in determination of whether a given listing is to be retrieved. The computer uses the class entry in each listing to determine the matching subroutine to be used in processing the listing. In addition, the computer uses the length entry in the listing to compute the address of the next listing to be processed after processing of the current listing has been completed. This address is used to directly address the next listing to be processed.

It is an object of this invention to facilitate the retrieval of information from a file by utilizing a selected type of listing format.

It is a more specific object of this invention to facilitate the program controlled retrieval of information from a file by associating each listing in the file with a selected one of a plurality of distinct classes of listings and including selected program control information in the format of each file listing.

It is another specific object of this invention to facilitate program controlled retrieval of information from a file of variable length listings by including an entry in each listing indicating the length of the listing and using this entry to determine the address of the next listing in the file.

It is still more specific object of this invention to facilitate the program controlled retrieval of information from a file by associating each variable length listing in a file with a selected distinct class by means of an entry in each of the listings in the class, which entry designates one of a plurality of matching subroutines to be used in processing listings in this class, and including another entry in each listing that is used to compute the memory address of the next listing to be processed after processing of the current listing has been completed.

The invention's primary advantage is that it greatly reduces the time required to search a file having the previously described characteristics. The reduction in search time allows more efficient use of an information retrieval system and results in a decrease in the cost of performing a search of an information file.

BRIEF DESCRIPTION OF THE DRAWINGS.

FIG. 2 shows a representation of a plurality of file listings contained in a portion of a file which is useful in describing the invention;

FIG. 3 shows a representation of the portion of the general purpose computer's memory containing the retrieval program that controls the computer during searches of the file;

DESCRIPTION OF THE INVENTION

Description of the System Operation

Figure 1:
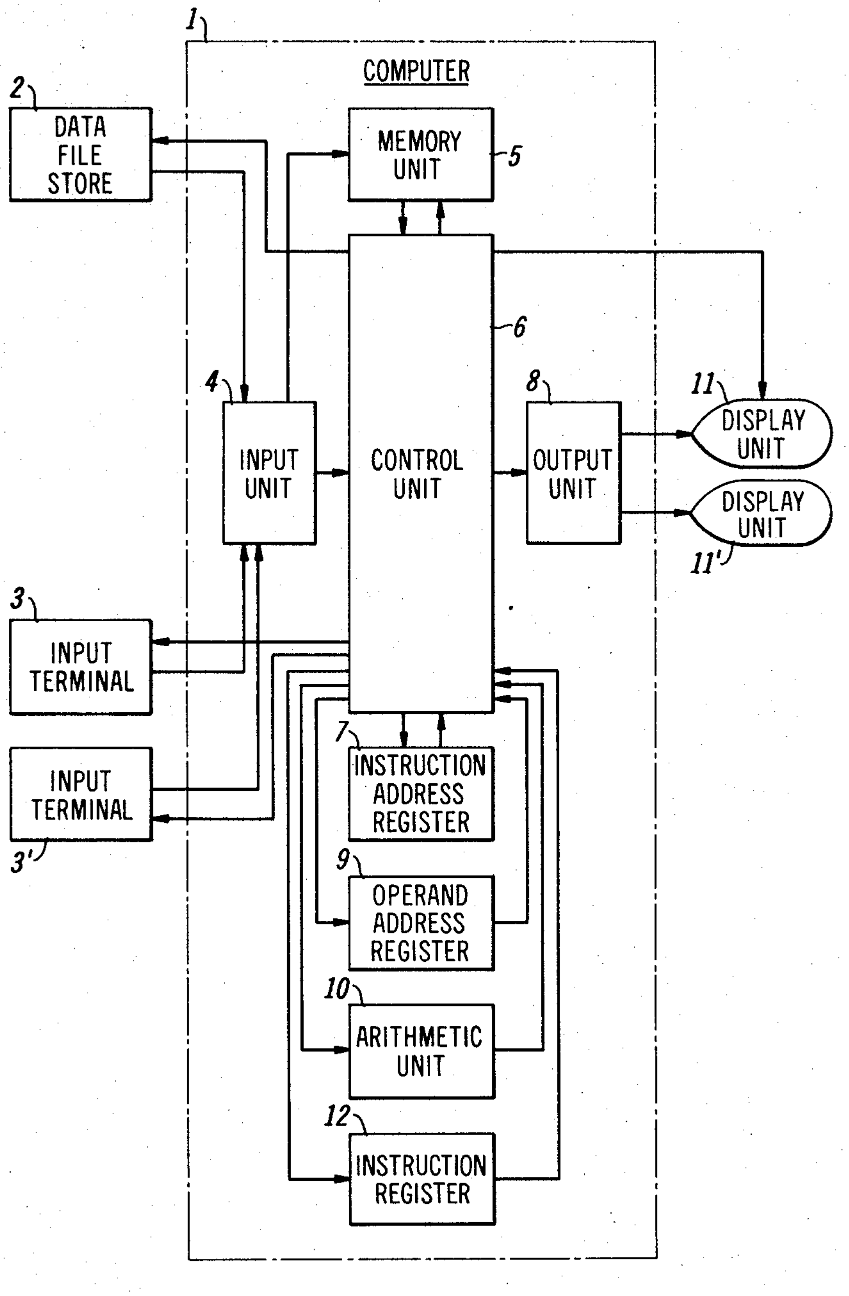
FIG. 1 shows a schematic block diagram of a stored program general purpose computer which may be used as an information retrieval system.

The general purpose computer system shown in FIG. 1 is representative of the type of hardware utilized in implementing the invention. This system comprises a data file store 2, input terminals 3 and 3', a general purpose digital computer 1 and display devices 11 and 11'. The data file store 2 may be any one of a number of devices for providing external storage in a computer system. Two devices most commonly used for such external storage are magnetic tapes and disk files. The input terminals 3 and 3' may be any one of numerous well known devices such as a teletypewriter input terminal. For purposes of explanation, the computer 1 may be assumed to the IBM 360 operating system which is fully described in IBM FORM C28-2003-3, IBM System/360 Time Sharing System Concepts and Facilities; and IBM FORM A22-6821-6, IBM System/360 Principles of Operation. The display devices 11 and 11' may be devices such as a crt graphic display or a high speed printer, both of which are well known. In order for the computer 1 to retrieve information from the file store 2 in accordance with the invention, applicants' program must be stored in the memory 5 of the computer.

The system in FIG. 1, when controlled by applicants' program, operates in the following manner. A user keys certain descriptors and their associated delimiters into the computer 1 via the input terminal 3. Since use of the terminal 3' results in the same operations as use of terminal 3, only the use of the latter terminal and the resulting display on unit 11 will be described to avoid needless repetition. These descriptors and delimiters are stored in a portion of the computer memory 5 and used during the search of the listings stored in the file store 2 to determine if any of the listings are to be retrieved from the file store 2 and displayed on the display unit 11. Once the descriptors and delimiters have been keyed into the computer 1, the computer begins searching the listings in the file store 2. As in the prior art, each delimiter is used to locate the file entry that is to be compared with its associated descriptor during a search. During this search, a set of listings having a common characteristic that matches a selected one of the descriptors is retrieved from the file and stored in a portion of the computer memory 5 for future reference.

After the set of listings has been stored in the computer memory 5 (FIG. 1), the computer then begins scanning the first listing in the set. Initially, the computer stores the memory address at which this first listing begins in a selected memory location in the memory unit 5. Then the computer control unit 6 extracts two fixed length bytes of information from the listing. The first of these bytes indicates the class of listings to which the listing being scanned belongs. The second byte indicates the length of the listing being examined. The length byte of the listing being processed is added to the stored memory address of the listing by the arithmetic unit 10 (FIG. 1) to obtain the memory address of the beginning of the next listing to be processed. This calculated address is stored in a selected location of the memory unit 5. Following this operation, the class byte extracted from the listing being processed is added to a constant stored in the memory unit 5, by the arithmetic unit 10, to obtain the address of the memory location containing the address of the matching subroutine. The matching subroutine is then indirectly addressed and used to compare the entries in the listing with the descriptors keyed into the computer by the user.

Reference to FIG. 3 is useful in describing the calculation and use of the matching subroutine address. The drawing in FIG. 3 is a map of a portion of the computer memory 5 (FIG. 1). It is a symbolic representation of the location of the program main flow and the various matching subroutines SUB1, SUB2, and SUB3 comprising applicants' retrieval program. As previously mentioned, the address of the desired matching subroutine is determined while the computer is under the control of the main flow which is stored in a portion of the memory 5 (FIG. 1) beginning at location PMF (FIG. 3). It will be recalled that the address of a matching subroutine is determined by adding the class byte contained in the listing being processed to a constant stored in a location in the computer memory 5 to obtain the address of the memory location containing the matching subroutine address. In order to conserve space in the listing format, the code comprising the class byte in the listing is restricted to fewer bits than are required for a full memory address. Consequently, the constant is provided as a base address to which the class byte is added to obtain the full memory address of the memory location containing the desired matching subroutine address. Indirect addressing of the matching subroutines insures that their locations in memory are independent of the length of the class bytes.

More specifically, after the retrieval program has been loaded into the computer memory 5 (FIG. 1) in a selected manner, it is possible to determine a constant BASE which satisfies the following conditions:

$$AMS1 = CL1 + BASE$$

$$AMS2 = CL2 + BASE$$

$$AMS3 = CL3 + BASE$$

The values AMS1, AMS2, and AMS3 (FIG. 3) represent the addresses of locations in memory that contain the addresses MS1, MS2, and MS3 of the matching subroutines SUB1, SUB2, and SUB3, respectively. These subroutines are the matching subroutines for class one CL1, class two CL2, and class three CL3 type listings, respectively. For example, if the listing from which the class byte is extracted is a class one listing, adding the class byte CL1 to the constant BASE yields the sum AMS1 which is the address of the memory location containing MS1, the address of the matching subroutine SUB1 for class one listings. As indicated by the equations, the subroutine addresses MS2 and MS3 are obtained in a similar manner when class two and class three type listings, respectively, are encountered by the computer 1 (FIG. 1) during a search of a set of listings stored in the computer memory.

For purposes of illustration, it will be assumed that, after locating a given listing, the computer performed the operations discussed above and the resulting subroutine address determined is MS1 (FIG. 3) which represents the address of the class one matching subroutine. Implicit in this assumption is the assumption that the given listing is a class one type listing which is to be processed by the class one matching subroutine SUB1 beginning at location MS1 (FIG. 3) in the memory 5 (FIG. 1) of the computer. After the calculation of the address AMS1 (FIG. 3). control of the computer 1 (FIG. 1) is transferred from the program main flow (FIG. 3) to the class one matching subroutine SUB1 (FIG. 3) by replacing the contents of the computer instruction address register 7 (FIG. 1) with the quantity MS1 contained in memory location AMS1 (FIG. 3). Performance of this indirect addressing operation transfers control of the computer to the instruction in memory location MS1 (FIG. 3) which is the first instruction in the class one matching subroutine SUB1. More specifically, the transfer of control is accomplished by replacing the contents of the instruction register 12 (FIG. 1) with the instruction in memory location MS1 (FIG. 3).

Once the computer is under the control of the class one matching subroutine, it compares selected entries in the class one file listing being processed with selected ones of the typed in descriptors to determine if this listing has the characteristics required for retrieval. The manner in which the comparisons are made by the computer is determined by the class one matching subroutine which was designed in such a way that the time required to determine whether a class one listing satisfies the retrieval criteria is minimized. In the case of class two and class three listings, the class two and class three matching subroutines, which are also designed to minimize the amount of time required to determine if a listing in their respective class satisfies the retrieval criteria, take control of the computer.

If a mismatch occurs between an entry of the listing being processed and a descriptor which is part of the retrieval criteria during the time the computer is under the control of the class one matching subroutine (FIG. 3), control of the computer is returned to a selected instruction in the program main flow (FIG. 3). Under these conditions, the listing for which the mismatch occurred is not displayed. On the other hand, if the listing being processed does satisfy the retrieval criteria, it is displayed on the display unit 11 (FIG. 1) and control is returned to the program main flow in the same manner as in the case of a mismatch. Upon regaining control of the computer, the program main flow (FIG. 3) locates the next listing to be matched against the retrieval criteria.

As previously mentioned, the program main flow (FIG. 3) locates the next listing to be processed by using an address that equals the sum of the beginning address of the listing just processed and the length byte contained in that listing. It will be recalled that this address was calculated and stored in memory when the listing that was just processed was initially accessed from the computer memory. The next listing to be processed is located in memory by executing an instruction that transfers the listing's calculated address into the operand address register 9 (FIG. 1). With this address in the register 9, the control unit 6 accesses the length byte contained in the newly located listing and transfers it to the arithmetic unit 10. The address of the third listing to be processed is then calculated by adding the accessed length byte to the address of the newly located listing from which it was accessed in the same manner as was previously described in the discussion of the first listing that was processed. The resulting address is stored in the computer memory 5 (FIG. 1) for use in locating the next listing to be processed after processing of the newly accessed or current listing is completed. Similarly, the class byte of the current listing is accessed by the control unit 6 and added to the constant BASE to obtain the address of the memory location containing the address of the matching subroutine that is to compare the entries in the current listing with the retrieval criteria. The remaining operations performed by the computer are identical to those previously described for the class one listing if the current listing is again a class one listing. If the current listing is other than a class one listing, the operations performed are essentially the same with the exception that the matching subroutine called will vary with the class indicated by the class byte.

The foregoing description of the operation of the information retrieval system shown in FIG. 1 may be summarized in the following manner. The system is operative when the listings from which retrievals are desired are contained in the file store 2 (FIG. 1) and the program main flow and matching subroutines (FIG. 3) are in the computer memory 5. Each listing in the file store 2 (FIG. 1) is of variable length and has a format that includes a fixed length class byte and length byte. The class byte in each listing is associated with a selected matching subroutine and the length byte indicates the length of the listing. To use the system, an individual keys a selected set of descriptors and associated delimiters into the computer 1 via the input terminal 3. This set of descriptors constitutes the retrieval criteria a listing must satisfy before it will be displayed. A portion of this retrieval criteria is used by the computer control unit 6, operating under the control of the program main flow, to load a selected set of listings into the memory 5 of the computer. The computer then locates a listing in the set and extracts the class and length bytes of that listing. The class and length bytes are used by the computer to determine the address of the matching subroutine that will control the computer during the comparison of selected listing entries with the retrieval criteria and to calculate the address of the next listing to be processed, respectively. Control of the computer is then transferred to the indicated matching subroutine (FIG. 3) which determines if the listing satisfies the keyed in retrieval criteria. Processing of the current listing is terminated immediately upon the occurrence of a match or mismatch with the retrieval criteria and the next listing to be processed is located by the computer. More specifically, if the listing does satisfy the criteria, it is displayed and control of the computer is returned to the program main flow which locates the next listing in the set of listings in memory to be processed using the calculated listing address. On the other hand, if the listing does not satisfy the retrieval criteria, it is not displayed and control of the computer is returned to the main flow as in the case where the listing is displayed.

Description of the Program Execution

While the foregoing discussion generally describes the operation of an information retrieval system in accordance with the invention, the novelty and advantages of the invention are even more apparent when it is described in terms of a specific illustrative example. In the following discussion, the invention will be described in terms of an illustrative program main flow and three matching subroutines which are designed to control the system in FIG. 1 when a selected type of file listing is to be retrieved. It will be assumed that a user keys in a specific set of descriptors comprising the retrieval criteria for a search and execution of the retrieval program in performing the search of a file of multiclass, variable length listings will be described.

An illustrative set of file listings is shown in FIG. 2. It will be noted that these listings are variable length with each entry field in a listing being identified by a delimiter $\alpha_1$ which is a selected code. In addition, the entry field following the $\alpha_1$ delimiter in each listing contains the fixed length class byte $CL_j$ and the length byte $LL_i$ as well as a last name. It will be recalled that the class byte in a listing is used to determine the address of the matching subroutine to be used in processing the listing and the length byte is used to determine the address of the next listing to be processed. Listings such as those shown in FIG. 2 might be used in numerous different applications. One specific application where such listings might be found is in a system which automates the retrieval of telephone numbers of individuals that are requested by subscribers. While this is an example of a specific application, it is not the only application where such listings would be found. Listings such as these would be useful in any system that automates the retrieval of stored information which can be identified by specifying selected characteristics of the information.

For illustrative purposes, three classes of listings are shown in FIG. 2. The listing shown in location MA1 is a class one listing and contains last name, first name, middle initial, town and telephone number entries. The listings in locations MA2 and MA3 are class two listings which contain the same entries as the class one listing and, in addition, a house address entry. The listing in location MA4 is a class three listing which differs from the class two listings in that it contains two house address entries. It is possible to reduce the amount of time required for the computer to determine if a listing in any one of these three classes satisfies specified retrieval criteria by providing a separate matching subroutine written especially for matching each class of listings against the retrieval criteria. The nature of the matching subroutines for listings from different classes vary because, as pointed out above, listings from different classes contain different entries.

Figure 4:
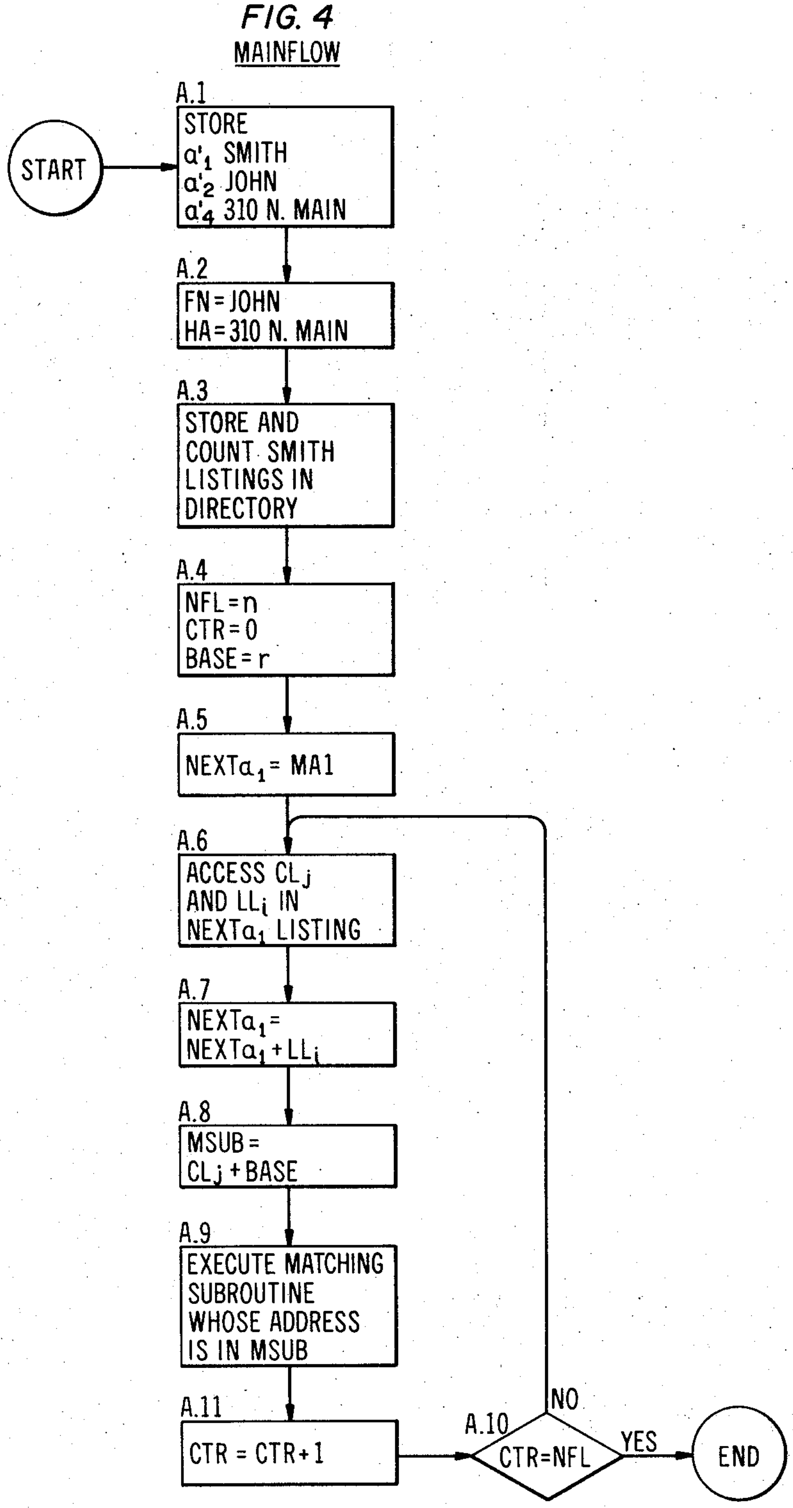
FIG. 4 is a flow chart showing the main flow of the retrieval program.
Figure 5:
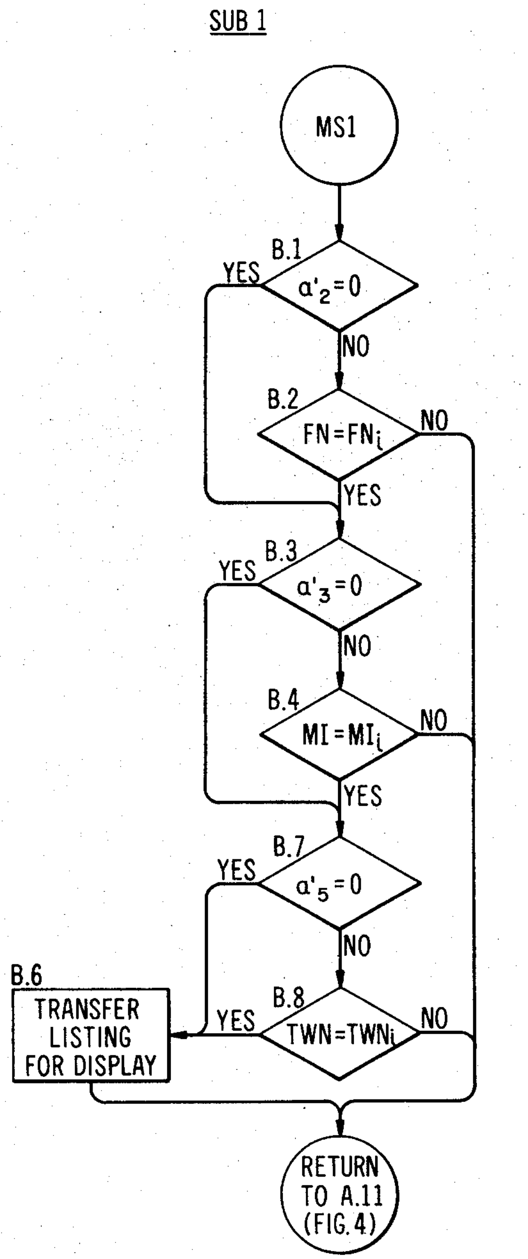
FIGS. 5 through 7 show flow charts of matching subroutines that are called by the main flow of the program to match selected classes of listings with retrieval criteria supplied by a user.
Figure 6:
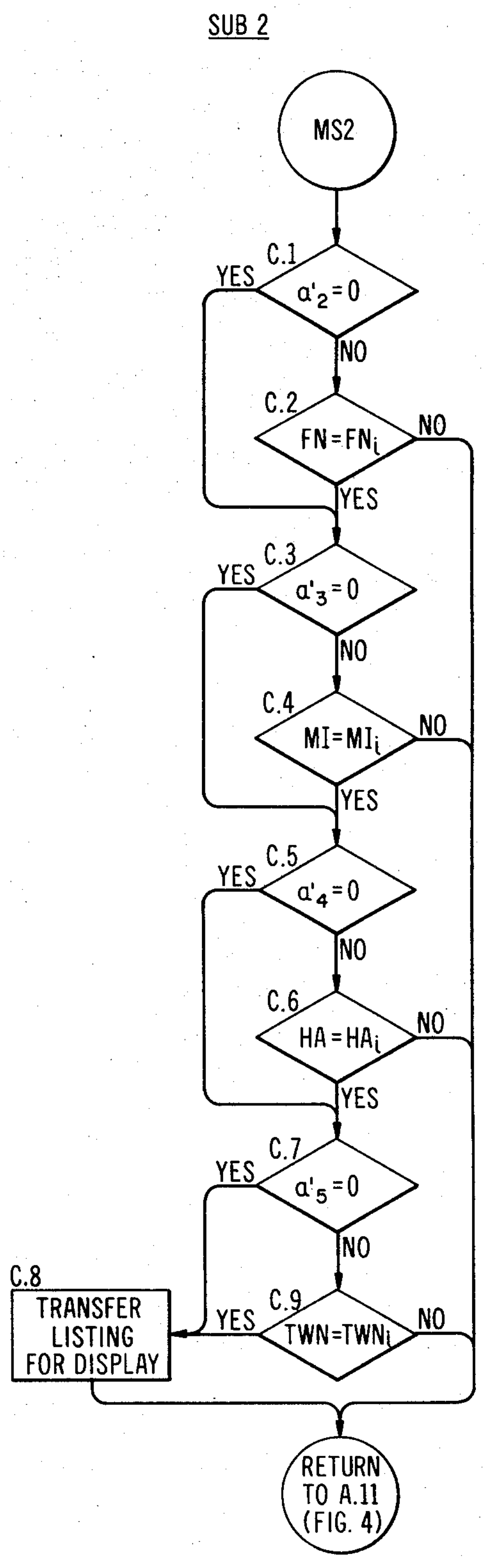
Figure 7:
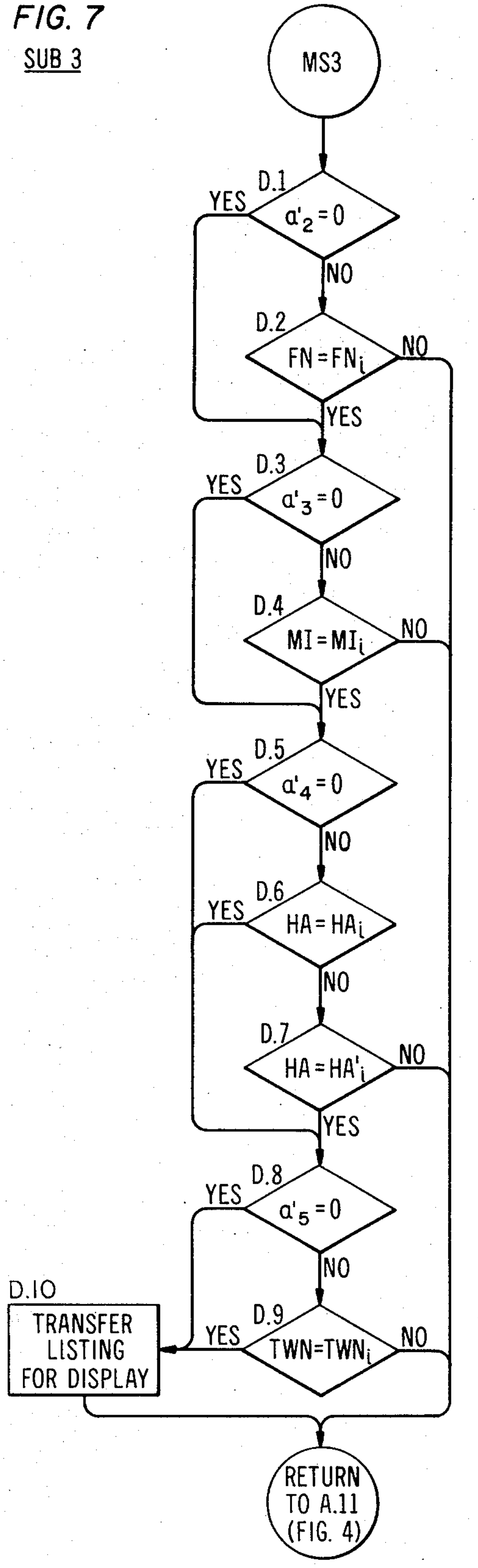

The program main flow is shown in FIG. 4 in the form of a flow chart. The program described by this flow chart takes control of the system in FIG. 1 when a user keys in descriptors and delimiters. The system stores the descriptors and delimiters, loads a selected set of the listings in the file store 2 into the memory 5, determines the address of the proper matching subroutine to process the first listing in the set of listings in memory, calculates the beginning address of the next listing to be processed, calls the matching subroutine beginning at the address calculated, and prepares for processing the next listing after the called matching subroutine has processed the current listing. Selected matching subroutines are described by the flow charts in FIGS. 5, 6, and 7. Each of these subroutines is designed to determine if a file listing of a selected class satisfies the retrieval criteria in a minimal amount of time. The subroutine in FIG. 5 is designed to process class one type listings which the subroutines in FIGS. 6 and 7 are designed to process class two and three type listings, respectively. As previously mentioned, the memory map in FIG. 3 shows the various portions of memory occupied by the program constituents discussed above.

Since the retrieval process is initiated by a user keying descriptors and associated delimiters comprising retrieval criteria into the computer 1 (FIG. 1) via the input terminal 3 (FIG. 1), it will be assumed that the following retrieval criteria is keyed into the computer for purposes of illustration;

$$\alpha_1' \text{ SMITH } \alpha_2' \text{ JOHN } \alpha_4' \text{ 310 N. MAIN}$$

where $\alpha_1'$ represents delimiters supplied by the user and equals the $\alpha_1$ delimiter contained in the stored file listings. In essence, this information specifies that the listings for the John Smith with a house address of 310 N. Main are to be retrieved. As previously mentioned, entering the above data places the computer under the control of the program main flow (FIG. 4). Referring to FIG. 4, execution of the set of program main flow instructions A.1 results in the computer storing the retrieval criteria. The next operation performed by the computer is the definition of the symbolic variables FN and HA in step A.2. The computer defines FN as the first name JOHN specified in the retrieval criteria. The symbolic variable HA is defined as the specified house address 310 N. MAIN. These variables will be used later during the execution of the matching subroutine that will be called by the program main flow.

In step A.3 (FIG. 4), the computer, using the keyed in descriptor SMITH, begins scanning the file store 2 (FIG. 1) searching for the set of listings having this name in their last name entry fields. When the desired set of listings is located in the file store 2 (FIG. 1), they are stored in a block of the computer memory 5 and a count *n* of the listings is compiled as they are stored. The table in FIG. 2 represents the set of SMITH listings as they are stored in the computer memory. These listings are transferred from the file store 2 (FIG. 1), which is a sequential access storage medium, to the computer memory 5, which is a random access storage medium, to allow faster processing of the listings. Storing the listings in the computer memory eliminates the need to wait for a period equal to the sequential readout time of a listing before processing of the next listing can be undertaken.

During the execution of the next step A.4 (FIG. 4) of the main flow program, the computer initializes a number of symbolically designated storage locations. The computer stores the value *n* in location NFL. It will be recalled that the value *n* is the count of the number of SMITH listings stored in the memory 5 (FIG. 1). The memory location identified as CTR is cleared to zero. This location is used to store a count that is incremented as each listing is processed. Finally, the computer stores the value *r* in the storage location BASE. It will be recalled that the value stored in BASE is such that the addition of a class byte extracted from a listing to this value results in a sum equal to the address of the memory location containing the address of the proper matching subroutine to be used in processing a listing of the indicated class.

In step A.5 of the execution of the program main flow, the computer stores the value MA1 in the storage location NEXT$\alpha_1$. Referring to FIG. 2, the address of the delimiter $\alpha_1$ in the first listing in the block of SMITH listings in memory is MA1. Hence, this value is stored in location NEXT$\alpha_1$ and it will be used to calculate the address of the delimiter $\alpha_1$ in the next listing to be processed. During the execution of steps A.6 through A.8 (FIG. 4) of the program main flow, the computer extracts the class CL1 and length LL1 bytes from the listing beginning at location MA1 (FIG. 2) and uses them to determine the beginning address of the next listing to be processed and the address of the matching subroutine to be used in processing the current listing. In step A.7, the memory location NEXT$\alpha_1$ which contains the value MA1, where MA1 is the beginning address of the first listing in FIG. 2, has the length byte LL1 from the first listing added to its contents. This addition yields the sum MA2 which is the beginning address of the second listing in FIG. 2. As a result of this addition, the sum MA2 then replaces the contents of the location NEXT$\alpha_1$ and will be used to address the second listing in FIG. 2 when processing of the first listing has been completed. In step A.8 (FIG. 4), the class byte CL1 from the first listing is added to the value *r* in location BASE. As previously indicated, the operation yields:

$$AMS1 = CL1 + BASE$$

where AMS1 is the address of the memory location containing the address of the class one matching subroutine SUB1. In essence, the first listing in FIG. 2 is a class one listing and the foregoing addition yields the address to be used in indirectly addressing the matching subroutine SUB1 (FIG. 3) designed to process this class of listing. The address AMS1 is stored in location MSUB and it will be used to call the matching subroutine beginning at this address.

In executing step A.9 of the program main flow (FIG. 4), the computer uses the address AMS1 stored in location MSUB to call the SUB1 matching subroutine shown in FIG. 5 by indirect addressing. In other words, the SUB1 matching subroutine is called by using the AMS1 address in MSUB to locate the memory location containing the SUB1 subroutine address MS1. The address MS1 is then used to call the SUB1 matching subroutine. Performance of the call operation transfers control of the computer from the program main flow (FIG. 3) to the instruction in location MS1 which contains the first instruction of the class one matching subroutine. At this point the computer begins executing the class one matching subroutine SUB1 (FIG. 3) to determine if the first listing MA1 in FIG. 2 satisfies the retrieval criteria keyed in by the user. Control of the computer will not be returned to the program main flow (FIG. 4) until this determination is made.

A flow chart describing the class one matching subroutine SUB1 is shown in FIG. 5. It will be recalled that class one type listings contain last name, first name, middle initial, town and telephone number entries but do not contain house address entries. The class one subroutine was written with this in mind. The subroutine design is such that if the descriptors keyed into the computer include a house address, the house address descriptor will be ignored during the matching operation. The reasoning behind this design is based on the fact that some individuals may not have included their house address in the listing as it appears in the file. The design eliminates the time that would be wasted in scanning the entries in a class one listing for a nonexistent house address entry.

More specifically, it will be recalled that a user was assumed to have keyed in the descriptors SMITH, JOHN, 310 N. MAIN for purposes of explanation. The descriptor SMITH was used during the execution of the program main flow (FIG. 4) to load all SMITH listings from the file store 2 (FIG. 1) in the computer memory 5. It is now necessary for the subroutine to determine if the entries in the first listing MA1 (FIG. 2) satisfy the remaining retrieval criteria. The first operation the computer performs in executing the class one matching subroutine (FIG. 5) is to determine if the user keyed in the delimiter $\alpha_2'$ which indicates that a match is to be performed on the first name entry in the listing. It is of interest to note that if the only descriptor keyed in by the user was SMITH, none of the matching operations B.2, B.4, or B.8 would be performed by the computer and every class one SMITH listing encountered would be displayed. However, in this case $\alpha_2' \neq 0$ since the user has keyed in $\alpha_2'$ JOHN as part of the retrieval criteria.

Since $\alpha_2' \neq 0$ the computer will match the contents of location FN, which contains the keyed in-descriptor JOHN, with the first name entry FN1 following the $\alpha_2$ delimiter in the first listing MA1 shown in (FIG. 2) which is currently being processed. It will be recalled that the computer compares the keyed delimiter $\alpha_2'$ with listing entries until the condition $\alpha_2' = \alpha_2$ occurs indicating that the first name field of the listing being processed has been located. Reference to FIG. 2 reveals that the first name entry in listing MA1 is also JOHN. Therefore, the first name descriptor and the first name entry FN1 in the MA1 (FIG. 2) listing match and the condition FN = FN1 exists. If this equality does not exist at the time the comparison B.2 (FIG. 5) is performed, the listing being processed cannot satisfy the specified retrieval criteria and the listing will not be displayed. For this situation, processing of the MA1 listing would cease and control the computer would be returned to the program main flow A.11 (FIG. 4) where preparation of the next listing to be processed occurs. However, since there is a match during the performance of the B.2 (FIG. 5) comparison, the class one subroutine retains control of the computer and this results in step B.3 being performed next by the computer.

The computer performs step B.3 (FIG. 5) to determine if the user keyed in a middle initial descriptor when specifying retrieval criteria. In the assumed case, no middle initial descriptor was keyed in and, therefore, the middle initial descriptor delimiter $\alpha_3'$ will be zero. The condition $\alpha_3' = 0$ indicates that the middle initial entry in a listing is not part of the retrieval criteria and this entry need not be considered when determining if the listing satisfies the specified retrieval criteria. Consequently, for $\alpha_3' = 0$, the computer does not perform the middle initial matching step B.4. Instead, the computer performs step B.7 next which involves determining if the user specified a town.

It will be recalled that the MA1 listing (FIG. 2) being processed is a class one listing and none of the class one listings contain a house address entry. Since the user has specified a house address in the example being discussed, the descriptor delimiter $\alpha_4'$ will not be equal to zero. However, the class one matching subroutine SUB1 (FIG. 5) does not detect the presence of house address descriptors since there is no house address field in a class one listing. Consequently, step B.7 is performed after the performance of the step 3 operation.

Since no town descriptor is present in the illustrative example, performance of step B.7 results in the operation in step 6 being performed next. Performance of the transfer operation in step B.6 results in the retrieval of the listing MA1 (FIG. 2) from memory for display. This transfer operation may result in the retrieval listing being immediately displayed on the display unit 11 (FIG. 1) or it may result in the storage of the listing in a portion of the memory 5 (FIG. 1) for display at some later time. As previously indicated, this class one listing is displayed since its last name and first name entries match the equivalent descriptors keyed in by the user. The house address descriptor is ignored because the MA1 (FIG. 2) listing is a class one listing containing no house address entry. The listing MA1 (FIG. 2) might be for the desired JOHN SMITH even though the listing contains no house address entry. The step B.8 was not performed by the class one subroutine SUB1 since no town descriptor was specified in the illustrative example.

After the computer has completed the transfer operation B.6 (FIG. 5) control of the computer is transferred back to the program main flow A.11 (FIG. 4). At this point, the computer must determine if the search of the set of listings in memory 5 (FIG. 1) has been completed and, if not, it must locate the next listing to be processed. In determining if the search of listings stored in memory 5 (FIG. 1) is complete, the computer first increments the contents of the storage location CTR by one A.11 (FIG. 4) to indicate that it has just finished processing a listing. Following this operation, the computer then compares the contents of the location CTR with a value $n$ stored in the memory location NFL to determine if any listings remain to be processed. It will be recalled that the location CTR was cleared in step A.4 when the file search was initiated and that the value $n$, calculated in step A.3 and stored in location NFL in step A.4, is the number of listings being searched. If the contents of CTR = NFL = $n$, this indicates the entire set of listings in memory has been searched and, hence, the search has been completed. However, in the case being discussed, only one listing MA1 (FIG. 2) has been processed and CTR = 1. Therefore, performance of the comparison in step A.10 results in the computer next performing the operations indicated in step A.6 which consist of locating the beginning address MA2 (FIG. 2) of the next listing and accessing the class and length bytes in this listing.

It is obvious that the flowcharts in FIGS. 4 and 5 bear nearly a one to one correspondence to FORTRAN IV programming language statements. For instance, the step A.2 (FIG. 4) would appear in FORTRAN IV code as follows: FN = JOHN and HA = I310N.MAIN. It will be noted that an I has been placed before the argument equated to HA and this is done merely to comply with the programming language requirements when symbolically identifying variables. Similarly, the step A.5 would be coded in the language exactly as it appears, as would be the case in coding the step A.7, after replacing the $\alpha_1$ with A1 in NEXT$\alpha_1$ to satisfy the program language requirements, and the step A.8. The step A.3 would be coded by merely using a conventional FORTRAN DO loop including a READ statement and a statement resulting in the incrementing of a memory location for every pass through the DO loop. The decision steps shown in FIG. 5 each may be encoded using a single FORTRAN IV statement having the general form of IF(LV·LO·JR) GO TO AD, where LV would be any one of the variables on the left side of the equal sign in any of the steps B.1 through B.8, LO represents a logical relationship between LV and JR, JR would be the corresponding value on the other side of the equal sign and AD would be the address to which program control is transferred if the condition is satisfied. For example, the step B.4 would be coded as IF(MI·NE·M I(I)) GO TO ALL. The step B.6 would merely require the standard code for transferring the selected listing to a segment of memory or a buffer from which a display unit 11 (FIG. 1), such as a crt graphic display, would take the data and convert it into a visual display. A detailed discussion of FORTRAN DO loops and the other coding statements required to implement these flowcharts may be found in McCracken, *A Guide to FORTRAN IV Programming*, John Wyley and Sons, Inc., (1965).

The foregoing discussion of FIGS. 4 and 5 has illustrated how the computer operates when a user keys in a set of descriptors as retrieval criteria and the first listing to be processed is a class one listing. When the descriptors are keyed into the computer, the set of listings containing a last name entry identical to the last name descriptor are loaded into memory 5 (FIG. 1) by the computer operating under control of the program main flow (FIG. 4). The computer then accesses the class CL1 (FIG. 2) and length LL1 bytes in the first listing MA1 to be processed and uses these bytes to determine the proper matching subroutine SUB1 (FIG. 5) and the beginning address MA2 (FIG. 2) of the next listing to be processed, respectively. Control of the computer is transferred to the matching subroutine SUB1 (FIG. 4) whose address was determined indirectly from the class byte CL1 extracted from the MA1 listing (FIG. 2). While under the control of this subroutine, the computer determines if the entries in the MA1 listing satisfy the remainder of the specified retrieval criteria. If the listing entries satisfy the retrieval criteria, the listing will be displayed and if its entries do not satisfy the criteria it will be disregarded. In either case, upon completing the processing of the MA1 listing while under control of the class one matching subroutine SUB1 (FIG. 5), control of the computer is returned to the program main flow (FIG. 4). At this point, under the control of the main flow, the computer determines if there are additional listings to be processed and if so, it locates the next listing to be processed and calls the appropriate matching subroutine for processing the listing.

In the case being discussed, the next listing to be processed is the second listing MA2 shown in FIG. 2. As previously discussed, during the preparation for processing the first listing MA1 (FIG. 2), the length byte LL1 was extracted from that listing, used to calculate the beginning address MA2 of the next listing to be processed, and this calculated address MA2 was stored in the NEXT$\alpha_1$ memory location (FIG. 4). Consequently, when control of the computer is transferred from the class one matching subroutine SUB1 (FIG. 5) to the program main flow (FIG. 4), after completing the processing of the first listing MA1 (FIG. 2), it uses the address MA2 stored in memory location NEXT$\alpha_1$ to locate the second listing to be processed. This operation is represented as step A.6 in the program main flow (FIG. 4). During the performance of this step, the computer accesses the class CL2 and length LL2 bytes from the second listing MA2 (FIG. 2) and uses them to determine the matching subroutine SUB2 (FIG. 3) to be used in processing this second listing and the beginning address of the next listing to be processed, respectively. These are the same type of operations that were performed in preparing to process the first listing MA1 (FIG. 2). The address of the third listing MA3 to be processed is the sum of the contents of the location NEXT$\alpha_1$ and the length byte LL2 accessed from the second listing MA2 (FIG. 2). The sum is stored in NEXT$\alpha_1$ and will be used to locate the third listing to be processed after processing of the second listing has been completed.

The address of the memory location containing the address of the matching subroutine to be used in processing the second listing MA2 (FIG. 2) is determined in step A.8 (FIG. 4) by adding the class byte CL2 accessed from that listing MA2 to the value $r$ stored in location BASE, just as was done when determining the address of the proper matching subroutine for processing the first listing. In the case under discussion, the sum AMS2 obtained from adding the class byte CL2 accessed from the second listing to the value $r$ is different from the address AMS1 obtained in the same way for the first listing MA1 processed since the two listings belong to different classes. The memory location AMS2 (FIG. 3) contains the SUB2 matching subroutine address MS2. The second listing MA2 belongs to the set of class two listings and the SUB2 routine is used to process listings in this class. Class listings of listings include all of the entries present in a class one listing and further include a house address entry. The presence of the additional house address entry in a class two listing requires that this type of listing be processed differently than a class of listings that include no such entry. The calculated address AMS2, used in indirectly addressing the class two matching subroutine SUB2, is stored in memory location MSUB in step A.8 (FIG. 4) and used step A.9 to call the class two matching subroutine SUB2 beginning at address MS2 (FIG. 3).

The call A.9 (FIG. 4) to the class two matching subroutine SUB2 (FIG. 2) results in this subroutine being indirectly addressed with the contents of memory location AMS2 and it takes control of the computer. A flow chart representing the SUB2 subroutine is shown in FIG. 6. This subroutine, like the class one subroutine SUB1 (FIG. 5), controls the computer in such a way that the keyed-in retrieval criteria $\alpha_2'$ JOHN $\alpha_4'$ 310 N. MAIN are matched against the corresponding entries in the listing being processed. The first operation performed in the execution of this subroutine is the comparison in step C.1 which determines if the descriptor delimiter $\alpha_2' = 0$. If $\alpha_2' = 0$, the computer skips the C.2 comparison and performs the C.3 comparison. However, since the first name descriptor JOHN was keyed into the computer, the descriptor delimiter $\alpha_2'$ used to indicate the presence of this descriptor will not be zero. Therefore, the next operation performed by the computer will be to locate the first name field in the second listing using the keyed-in delimiter $\alpha_2'$. After the first name field has been located, the comparison C.2 occurs which determines if the keyed-in first name descriptor matches the first name entry in the listing MA2 (FIG. 2) being processed. If the two first names do not match, the listing does not satisfy the retrieval criteria and control of the computer is returned to the program main flow without displaying the listing. In the case under discussion, however, the two first names do match and the computer remains under the control of the SUB2 matching subroutine.

The next operation performed by the computer is the comparison in step C.3 (FIG. 6) to determine if a middle initial descriptor was specified by the user. In the illustrative example, no middle initial descriptor was keyed into the computer, and the descriptor delimiter $\alpha_3' = 0$. As a result of this condition, the computer skips the middle initial comparison C.4 since the middle initial is not part of the retrieval criteria. The next operation performed by the computer, following the performance of the step C.3 operation, is the operation in step C.5.

The purpose of performing the operation in step C.5 is to determine if a house address descriptor was keyed in as part of the retrieval criteria. In this case the house address 310 N. MAIN was keyed in and, therefore, the descriptor delimiter $\alpha_4'$ used to indicate the presence of the house address descriptor is not zero. When the computer performs the operation in step C.5 and $\alpha_4' \neq 0$, the next operation performed by the computer will be the house address comparison in step C.6. This comparison is performed to determine if the house address entry in the MA2 listing (FIG. 2) matches the house address descriptor that is part of the retrieval criteria.

In essence, the computer compares the house address descriptor 310 N. MAIN with the house address entry 220 WEST AVE. in the MA2 listing (FIG. 2). Since these two addresses are not identical, the MA2 listing does not satisfy the retrieval criteria and should not be displayed. Consequently, performance of the operation in step C.6, when the descriptor house address HA is not the same as the MA2 listing house address, results in control of the computer being transferred to the program main flow A.11. Due to this transfer of control, the computer does not perform any of the operations in steps C.7, C.8, and C.9 and, hence, the MA2 listing is not displayed.

The foregoing is an example of a case where a class two listing MA2 (FIG. 2) is located by an address determined by the length byte LL1 in the listing MA1, and processed by the class two matching subroutine SUB2 (FIG. 6) which is called with an address determined by the class byte CL2 in the MA2 listing. During the processing of the MA2 listing by the class two subroutine SUB2, a mismatch occurred when the house address descriptor specified by the user was compared with the house address entry in the MA2 listing. This mismatch indicated that the MA listing did not satisfy the retrieval criteria and the listing was not displayed. Control of the computer was returned to the program main flow (FIG. 4) upon the occurrence of the mismatch where preparations will be made to process the next listing.

As previously indicated, control of the computer was transferred from the class two matching subroutine SUB2 (FIG. 6) to the program main flow (FIG. 4) when the mismatch in house addresses occurred to step C.6 of the matching subroutine during the processing of the MA2 listing (FIG. 2). This transfer of control results in the computer incrementing the contents of the counter CTR in step A.11 of the main flow (FIG. 4) and then performing step A.10 to determine if all $n$ listings in memory have been processed. Since the MA2 listing (FIG. 2) is not the last listing in the group of listings in memory, the computer performs step A.6 next. Performance of step A.6 results in the class CL2 and length LL3 bytes of the MA3 listing being accessed. It will be recalled that the beginning address of the MA3 (FIG. 2) listing is contained in the location NEXT$\alpha_1$ and this address is the sum of the length bytes LL1 and LL2 contained in the previously processed MA1 and MA2 listings.

Following the accessing of the two bytes from the MA3 listing (FIG. 2), the computer calculates the beginning address of the listing MA4 by adding the length byte LL3 to the contents of NEXT$\alpha_1$ in step A.7 and then calculates the address of the memory location containing the address of the matching subroutine to be called to process the MA3 listing. The operations are the same as those described in the discussion of the first two listings processed. As in the previous instances, the calculated address for the MA4 listing is stored in the location NEXT$\alpha_1$ for use after the processing of the MA3 listing is completed and the calculated subroutine address is used to indirectly address the desired matching subroutine for processing the MA3 listing.

The MA3 listing (FIG. 2) is a class two listing, as was the previously processed MA2 listing, and the address resulting from the addition of the MA3 listing's class byte CL2 to the value in location BASE in step A.8 (FIG. 4) will again be the address AMS2 (FIG. 3) which contains the address MS2 of the class two subroutine SUB2 (FIG. 6). Consequently, control of the computer is transferred from the program main flow to the subroutine SUB2 when the computer performs the indirect addressing operations in step A.9 (FIG. 4). The SUB2 subroutine operations performed by the computer while processing the MA3 listing (FIG. 2) will be identical to those described above in the discussion of the processing of the MA2 listing until the computer compares the two house addresses.

When the computer performs the comparison in step C.6 (FIG. 6) while processing the MA3 listing (FIG. 2), the house address descriptor 310 N. MAIN specified by the user will match the house address entry in the listing. When this match occurs, the computer will perform step C.7 next instead of having its control transferred back to the program main flow (FIG. 4) as was done upon the occurrence of a mismatch of addresses during the processing of the MA2 listing. The purpose of the operation in step C.7 is to determine if the user specified a town descriptor as part of the retrieval criteria. In this case, no such descriptor was specified and the town comparison C.9 is not performed. Instead the computer performs the operations in step C.8 which result in the MA3 listing being ultimately displayed. The comments previously made in discussing the coding of the flowchart in FIG. 5 also apply to the flowchart in FIG. 6. Each of the steps in FIG. 6 may be encoded by using the previously discussed FORTRAN IV statement of the general form IF(LV·LO·JR) GO TO AD where, in the case of the step C.4, LV =

MI,LO=NE,JR = MI(I) and AD = ALL. The step C.8 like the step B.6 in FIG. 5, merely requires a simple code for transferring the selected listing to a selected portion of memory or a buffer that supplies the input data for a display unit.

The foregoing discussion of the MA2 and MA3 listings (FIG. 2) indicates the operations performed by the computer, under control of the class two matching subroutine SUB2 (FIG. 6), while processing two class two listings with different house address entries. Since the MA2 listing contains a house address entry that differs from the house address descriptor specified by the user, the listing does not satisfy the retrieval criteria and control of the computer is transferred from the SUB2 subroutine (FIG. 6) to the program main flow (FIG. 4) without displaying the listing. On the other hand, the MA3 listing satisfies the retrieval criteria since all the descriptors constituting the retrieved criteria are matched by corresponding entries in the listing. Consequently, the computer performs operations that result in the ultimate display of the MA3 listing before control of the computer is returned to the program main flow (FIG. 4).

As in the previous instances, control of the computer is returned to the main program flow (FIG. 4) when the processing of the MA3 listing under the control of the selected matching subroutine SUB2 (FIG. 6) is completed. For the case of the MA3 listing, the transfer of control results after the computer completes the display operations in step C.8 of the MS2 matching subroutine (FIG. 6). When this transfer of control occurs, the computer again determines if there are additional listings to be processed by performing steps A.11 and A.10 (FIG. 4). Since there are additional listings to be processed, the computer will perform the operation of locating the next listing to be processed A.6 (FIG. 4) using the address stored in the NEXT$\alpha_1$ location of memory. It will be recalled that this address was calculated by adding the length byte LL3 of the listing MA3 just processed to the contents of the NEXT$\alpha_1$ location in memory when the computer was preparing to process the MA3 listing. The sum NEXT$\alpha_1$ + LL3 equalled MA4. Hence, using the MA4 address stored in NEXT$\alpha_1$, the computer accesses the class CL3 and length LL4 bytes of the listing MA4 (FIG. 2) and performs the operations in steps A.7 through A.8 (FIG. 4) as was done in the case of preceding listings. In this instance, LL4 is added to the contents of NEXT$\alpha_1$ to obtain the beginning address of the next listing to be processed. It will be noted that the MA4 listing is a class three listing containing more than one house address entry. The class byte CL3 accessed from the MA4 listing is added to the contents of the location BASE to obtain the address AMS3 (FIG. 3) of the memory location containing address MS3 of the class three matching subroutine SUB3. This address AMS3 is then used by the computer in step A.9 to indirectly address the SUB3 subroutine in transferring control of the computer from the program main flow to the subroutine SUB3 (FIG. 7).

The initial operations performed by the computer under control of the subroutine SUB3 (FIG. 7) are the same as the operations performed by the computer in processing all of the listings discussed above. The first name descriptor is compared D.2 (FIG. 7) with the first name entry in the MA3 listing (FIG. 2). Since these match, and no middle initial descriptor has been specified, the next descriptor to be matched will be the house address descriptor. At this point, the sequence of operations the computer performs differs from those if performed in other matching subroutines. Since the MA4 listing (FIG. 2) is a class three listing, it contains two house addresses. Consequently, if a house address descriptor HN has been specified, the descriptor may have to be matched with both house address entries in the MA4 listing to determine if that listing satisfies the retrieval criteria. For example, it is possible that the first house address entry in a class three listing is different from the user specified house address descriptor HA while the second house address entry in the listing matches the descriptor. In this case, the listing would satisfy the retrieval criteria relating to house address but this could only be ascertained after matching both house address entries in the listing with the house address descriptor.

After performing step D.4 (FIG. 7) where the condition $\alpha_4' \neq 0$ indicates that a house address descriptor has been specified by the user, the computer will perform both steps D.6 and D.7 even though there may be a mismatch during the performance of step D.6. This differs from the sequence of operations the computer performed while under the control of the class two SUB2 (FIG. 6) matching subroutine. In that case, the computer made only one comparison C.6 of the house address descriptor HN and if this indicated a mismatch, a control of the computer was immediately returned to the program main flow (FIG. 4). Similarly, the sequence of operations performed by the class three subroutine SUB3 differs from that performed by the computer while under the control of the class one matching subroutine SUB1 (FIG. 5) since the latter subroutine did not even provide for the matching of a house address descriptor.

When the computer performs the matching operation in step D.6 of the subroutine SUB3 (FIG. 7) while processing the MA4 listing (FIG. 2) a mismatch will occur. Obviously 105 MAIN is not the same address as the user specified descriptor 310 N. MAIN. Instead of control of the computer being transferred back to the program main flow (FIG. 4) as a result of this mismatch, the computer will remain under the control of the subroutine SUB3 and perform step D.7 next. It is of interest to note that if the first house address entry in the MA4 listing has matched the house address descriptor in step D.6, the computer would have skipped step D.7 and performed the same operations it performed while under the control of the other matching subroutines. The performance of step D.7 would not be necessary for this situation. Since the first house address entry in the MA4 listing satisfied the house address retrieval criteria, the nature of the second house address entry in the listing would be irrelevant in determining if the listing should be displayed. However, in the illustrative example being discussed, there is a mismatch in performing comparison in step D.6 and, therefore, comparison in step D.7 will be performed.

When the computer performs the comparison in step D.7, another mismatch will occur since the second address entry 501 N. ASH in the MA4 listing being processed is not the same as the descriptor 310 N.

MAIN. The occurrence of a mismatch in step D.7 establishes that neither house address entry in the MA4 listing matches the specified house address descriptor and, therefore, the listing does not satisfy the specified retrieval criteria. Consequently, control of the computer is returned to the program main flow (FIG. 4) without displaying the MA4 listing. The operations performed by the computer when it is once more under the control of the program main flow are the same as previously described. It will locate the next listing to be processed and use the class and length bytes in this listing in the same manner as previously described in the discussion of the processing of listings MA1 through MA4.

The operations the computer performs under the control of the program main flow (FIG. 4) and the selected matching subroutines will continue until the last lasting MA$n$ stored in the computer memory 5 (FIG. 1) has been processed. When this occurs, control of the computer will be transferred to the program main flow A.11 (FIG. 4) from the particular matching subroutine being used to process the MA$n$ listing. The computer will increment the contents of the location CTR in step A.11 and in this case, since MA$n$ was the $n$th listing to be processed, CTR will contain the value $n$ after being incremented. Following this incrementing, the computer will compare the contents of location CTR with the contents of location NFL, which contains the number of file listings in memory $n$, in step A.10 of the program main flow. Since CTR contains the value $n$, CTR = NFL and the search of the listings stored in memory has been completed. Consequently, control of the computer is relinquished by the retrieval program being discussed and this program will not take control of the computer again until a new set of descriptors are keyed by a user. As in the case of the previously discussed flowcharts in FIGS. 5 and 6, the decision steps in the flowchart in FIG. 7 may each be encoded with a single FORTRAN IV statement of the general form IF(LV·LO·JR) GO TO AD. For example, when the step D.4 is coded, LV = MI, LO = NE, JR = MI(I), and AD = ALL resulting in the coding for the step being IF(MI·NE·MI(I)) GO TO ALL. The step D.10 is implemented in code in the same manner as previously described in discussing the steps B.6 (FIG. 5) and C.8 FIG. 6).

The foregoing detailed description may be summarized as follows. The set of file listings used in the description include variable length listings of three different classes. Each listing contains a fixed length class byte and length byte. The retrieval operation is initiated by a user keying a set of descriptors and delimiters, comprising the retrieval criteria, into the computer. The computer, operating under the control of a program main flow, accesses a selected portion of the set of file listings stored on an external storage device and stores these listings in its own memory. In the illustrative embodiment, the listings stored in the computer memory were those which had SMITH as a last name entry. After this storage operation is completed, the computer locates the first listing in the set of listings stored in its memory and accesses the class and length byte from the listing. The accessed length byte is used to calculate the beginning address of the next listing to be processed. This calculated address is stored until processing of the first listing is completed. The accessed class byte is used to determine the address of the proper matching sub-routine to be used in processing the first listing and this address is used to indirectly address the proper matching subrouting when transferring control of the computer to a matching subroutine. After the computer, operating under control of the matching subroutine, completes the processing of the first listing, control of the computer is returned to the program main flow and the stored listing address, calculated with the first listing length byte, is used to locate the second listing to be processed. The following operations are similar to those described above with the exception of the matching subroutine selected to process the listing which will vary if the class byte in the second listing varies.

In view of applicants' disclosure, various different modes of implementing the invention will be readily apparent to one skilled in the art. For instance, the disclosed program may be written in any one of many well known programming languages by one skilled in the art. Similarly, the invention could be readily implemented on a wired program system as opposed to the stored program system in the illustrative embodiment.

What is claimed is:

1. The machine method of retrieving a listing from a file comprised of listings whose formats include selected control information in addition to descriptor information which comprises the steps of;

1. specifying selected retrieval criteria;
2. accessing the control information in a first listing selectively determined by said retrieval criteria; and
3. altering the operation of said machine in further processing said listing in accordance with a selected portion of the accessed control information.

2. The method of claim 1 further comprising the steps of;

4. determining the address of the second listing to be processed from a selected portion of said control information accessed from said first listing; and
5. accessing the control information in the second listing identified by said address after the processing of said first listing is completed.

3. The machine method of retrieving a selected listing from a peripheral file unit containing listings whose formats include a listing class indicator comprising the steps of;

1. specifying selected retrieval criteria;
2. accessing the class indicator in the format of a listing with characteristics satisfying a selected portion of said retrieval criteria; and
3. selecting a strategy of machine operation identified by said class indicator for determining if the characteristics of said listing satisfy all of said retrieval criteria.

4. The machine method of retrieving a selected listing from a peripheral file unit containing variable length listings whose formats include a fixed length listing class indicator and listing length indicator, comprising the steps of;

1. specifying selected retrieval criteria;

2. accessing the class indicator in the format of a current listing with characteristics satisfying a selected portion of said retrieval criteria;
3. accessing the listing length indicator in the format of said current listing;
4. determining the beginning address of the next listing to be processed from said listing length indicator accessed from said current listing; and
5. selecting a strategy of machine operation identified by said class indicator accessed from said current listing for determining if the characteristics of said current listing satisfy all of said retrieval criteria.

5. The computer method of retrieving a selected listing, under program control, from a peripheral file unit containing listings whose formats include a listing class indicator comprising the steps of;

1. specifying selected retrieval criteria;
2. transferring all listings in said file unit having characteristics satisfying a selected portion of said retrieval criteria into the computer memory;
3. accessing the class indicator in the format of a selected listing in said memory;
4. calculating the address of one of a plurality of memory locations containing addresses of matching subroutines stored in said memory with said class indicator; and
5. calling the matching subroutine identified by said address.

6. The method of claim 5 wherein the formats of said listings in said file are of variable length and include a listing length indicator wherein step (3) further comprises the steps of;

6. accessing the length indicator in the format of said selected listing; and
7. determining from said length indicator the address of the listing to be processed after processing of said selected listing is complete.

7. A method of operating a computer with a computer program stored in its memory which program includes a program main flow and a plurality of matching subroutines for retrieving selected listings from a peripheral file unit containing listings with listing class bytes and listing length bytes in their formats in addition to descriptors, the method being comprised of the steps of;

1. placing said computer under the control of said program main flow;
2. storing user specified retrieval criteria;
3. transferring listings having selected descriptors in their formats that match a selected portion of said retrieval criteria from said file into a selected portion of the computer memory;
4. accessing the class byte in the format of a selected listing in said memory;
5. accessing the length byte in the format of said selected listing;
6. translating said class byte into the address of a memory location containing the address of a selected one of said matching subroutines;
7. translating said length byte into the address of the listing to be processed after processing of said selected listing has been processed;
8. indirectly addressing the subroutine identified with said address obtained in step (6) for processing said selected listing by matching its descriptors against said retrieval criteria;
9. returning control of said computer to said program main flow after processing of said selected listing has been completed; and
10. accessing the listing identified by the listing address obtained in step (7).

* * * * *

UNITED STATES PATENT OFFICE
CERTIFICATE OF CORRECTION

Patent No. 3,702,010 Dated October 31, 1972

Inventor(s) Robert B. Schmidt-George W. Smith, Jr.- Robert B. Walford

It is certified that error appears in the above-identified patent and that said Letters Patent are hereby corrected as shown below:

Column 2, line 35, "second file list" should read --second file listing--. Column 3, line 21, "It is still" should read --It is a still--. Column 4, line 6, "be assumed to" should read --be assumed to be--. Column 11, line 37, "and control the" should read --and control of the--. Column 15, line 67, "occurred to step" should read --occurred at step--. Column 18, line 51, "listing has matched" should read --listing had matched--.

Signed and sealed this 19th day of March 1974.

(SEAL)
Attest:

EDWARD M. FLETCHER, JR.
Attesting Officer

C. MARSHALL DANN
Commissioner of Patents